US008964576B2

(12) United States Patent
Laipio et al.

(10) Patent No.: US 8,964,576 B2
(45) Date of Patent: Feb. 24, 2015

(54) SYSTEM AND METHOD OF REPORTING IN-SERVICE PERFORMANCE STATISTICS IN LAYERED NETWORKS

(75) Inventors: Kari Laipio, Kirkkonummi (FI); Jussi Maki, Hägersten (SE)

(73) Assignee: Unwired Planet, LLC, Reno, NV (US)

( * ) Notice: Subject to any disclaimer, the term of this patent is extended or adjusted under 35 U.S.C. 154(b) by 805 days.

(21) Appl. No.: 12/532,319

(22) PCT Filed: Mar. 22, 2007

(86) PCT No.: PCT/EP2007/052739
§ 371 (c)(1),
(2), (4) Date: Nov. 19, 2009

(87) PCT Pub. No.: WO2008/113418
PCT Pub. Date: Sep. 25, 2008

(65) Prior Publication Data
US 2010/0067394 A1    Mar. 18, 2010

(51) Int. Cl.
*G01R 31/08* (2006.01)
*H04W 4/00* (2009.01)
*H04W 24/08* (2009.01)
*H04W 76/06* (2009.01)
*H04W 88/14* (2009.01)

(52) U.S. Cl.
CPC ............. *H04W 24/08* (2013.01); *H04W 76/06* (2013.01); *H04W 88/14* (2013.01)
USPC .......................................... 370/252; 370/329

(58) Field of Classification Search
USPC ................................. 370/216, 352
See application file for complete search history.

(56) References Cited

U.S. PATENT DOCUMENTS

| 7,512,104 | B2 * | 3/2009 | Bjelland et al. | 370/338 |
| 2005/0213520 | A1 * | 9/2005 | Bae et al. | 370/277 |
| 2006/0084429 | A1 | 4/2006 | Buvaneswari et al. | |
| 2006/0268845 | A1 * | 11/2006 | He et al. | 370/352 |

(Continued)

FOREIGN PATENT DOCUMENTS

| EP | 1 631 099 A | 3/2006 |
| WO | WO 2005/013514 A | 2/2005 |

OTHER PUBLICATIONS

ITU-T E.800, "Series E: Overall Network Operation, Telephone Service, Service Operation and Human Factors" International Telecommunication Union, Telecommunication Standardization Sector of ITU, Sep. 2008, 30 pages.

(Continued)

*Primary Examiner* — Brandon Renner
(74) *Attorney, Agent, or Firm* — Nixon & Vanderhye P.C.

(57) ABSTRACT

A system and method of reporting in-service performance statistics in a network. The method includes the steps of a node detecting a problem related to a call connected within the network. A problem notification message is then 5 sent to the MSC. The MSC sends a call release message to one or more nodes within the network. The call release message includes a request to release all resources associated with the call. In response to the release request, the node releases all resources associated with the call. In addition, the node sends a release response message to the MSC. The release response message is 10 modified to include information relating to the call problem, thereby providing network statistics to the MSC. Preferably, the node is a Media Gateway (MGw) which sends a H.248 subtract response message modified to include information on the call problem.

16 Claims, 6 Drawing Sheets

(56) References Cited

U.S. PATENT DOCUMENTS

2007/0019658 A1    1/2007  Park et al.
2007/0195752 A1*   8/2007  Gayde et al. .................. 370/352
2007/0207808 A1*   9/2007  Park ............................. 455/445
2008/0146208 A1*   6/2008  Ejzak et al. ................... 455/416

OTHER PUBLICATIONS

ITU-T E.801, "Series E: Telephone Network and ISDN" International Telecommunication Union, Telecommunication Standardization Sector of ITU, Oct. 1996, 20 pages.

* cited by examiner

SYSTEM AND METHOD OF REPORTING IN-SERVICE PERFORMANCE STATISTICS IN LAYERED NETWORKS

This application is the U.S. national phase of International Application No. PCT/EP2007/052739, filed Mar. 22, 2007, which designated the U.S.

TECHNICAL FIELD OF THE INVENTION

The present invention relates generally to communications networks, and in particular, to communications networks that employ methods to report in-service performance statistics.

DESCRIPTION OF RELATED ART

Figure 1:
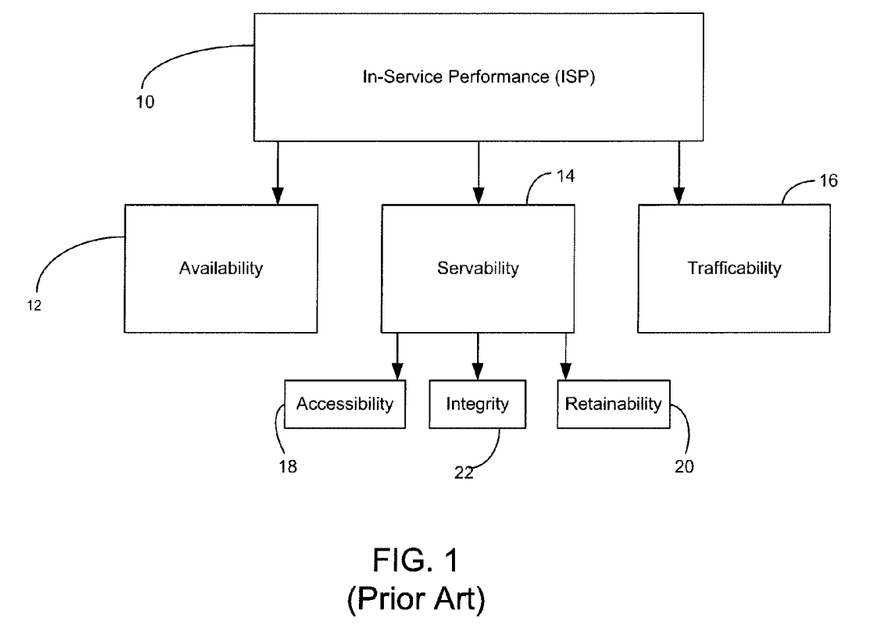
FIG. 1 (prior art) is a simplified block diagram illustrating the basic components of the In-Service Performance concept.

The In-Service Performance (ISP) concept describes many aspects of the system reliability of a network. FIG. 1 is a simplified block diagram illustrating the basic components of the In-Service Performance concept. The ISP concept 10 is based on three categories, availability 12, servability 14 and trafficability 16. Availability is utilized to measure availability metrics associated with telecommunications systems and is an essential category of statistics in regards to centralized systems. Servability is a category essential in measuring statistics in distributed systems. The severability category is further divided into accessibility 18, retainability 20 and integrity 22. Trafficability is the ability of an item to meet a traffic demand of a given size as well as other characteristics for a given internal condition of the network. The ISP concept is further specified in the International Telecommunications Union standard ITU-T E.800.

Existing mobile networks logically divide the infrastructure into a Core Network and an Access Network. The basic Core Network includes circuit-switched nodes, such as Mobile Switching Centers (MSCs), packet-switched nodes, such as General Packet Radio Service support nodes (SGSNs) and control nodes, such as Home Location Registers (HLRs). The basic Access Network includes radio control nodes and radio access nodes. The radio control nodes may include Base Station Controllers (BSCs) for GSM (Global System for Mobile Communications) radio networks and Radio Network Controllers (RNCs) for UMTS (Universal Mobile Telecommunications System) radio networks. In addition, the radio access nodes may be Base Transceiver Stations (BTSs) for GSM radio networks and Node Bs for UMTS radio networks. Current mobile networks also partly utilize a layered network architecture. Call control and connectivity, which have traditionally been bundled in telecommunications networks, are now separate layers within the Core Network circuit-switched domain. This separation is achieved by dividing the MSCs into Media Gateways and network servers. The call control layer is resident in the MSC servers, while the connectivity layer is resident in the Media Gateways.

The Media Gateways serve to bridge the different transmission technologies and to add service to end-user connections. The Media Gateways use open interfaces to connect between the Core Network and an Access network. The media gateway control interface (H.248) facilitates this separation of call control and connectivity layers. Media Gateways are located within the Core Network as an interface to both the Access Networks and to legacy networks, such as the Public Switched Telephone Network (PSTN).

In existing layered architecture, the ISP 10 is defined in terms of the availability 12 per node (i.e., the MSC and the Media Gateway (MGw)). Trafficability 16, servability 14 and its subcategories of accessibility 18, retainability 20 and integrity 22 are not considered. In further layered architecture, ISP measurements may cover accessibility, retainability and integrity.

In the layered network architectures, MGw nodes report call related problems by using H.248 notify or service change messages. Notification and service change messages provide information about user plane problems experienced in the H.248 standard. Currently, when a call related problem is experienced in a network, the problem is detected by many nodes participating on the call or by the mobile subscriber. In this situation, many of the nodes attempt to notify the MSC server about the call related problem. The MSC then initiates call release procedures when it receives the first notification about a call break. Typically, only one of the nodes knows the exact reason for the call related problem. However, other nodes merely report that a problem was detected for the call without providing detailed information about the nature or cause of the problem. In some instances, the mobile subscriber makes the decision to disconnect the call because of dissatisfaction with the quality of the call. However, these mobile subscriber-initiated call disconnects are treated as successful cases from the network signaling point of view.

Currently, network performance statistics are collected based on the information provided by the notifications from the various nodes. However, this leads to inaccurate ISP measurement results. Specifically, in most situations, the MSC is not provided with the reason for a call release. MGw problems or other network problems are not properly identified to the MSC. Oftentimes, bad speech quality results in the subscriber disconnecting the call, which does not allow the MSC to receive a problem source notification. In the situation of MGw problems, the MGw notifies the MSC in conjunction with other nodes, such as the RNC or BSC. All these notifications may occur in parallel. However, only the notification from the node where the break occurs provides information on the problem. In the case of backbone network problems (e.g., problems with ATM switches or IP routes), the problem is noticed by many nodes but also ends up as a successful call release notification from the network signaling point of view as the mobile subscriber initiates the call release.

For the above reasons, the network statistics measured by the MSC are unreliable. Additionally, it is not possible to measure the network performance statistics from the MGw nodes as the MGw only has knowledge about terminations and contexts while the relationship between this information and the calls is not known. The relationship between contexts, terminations and calls is only know by the MSC.

Figure 2:
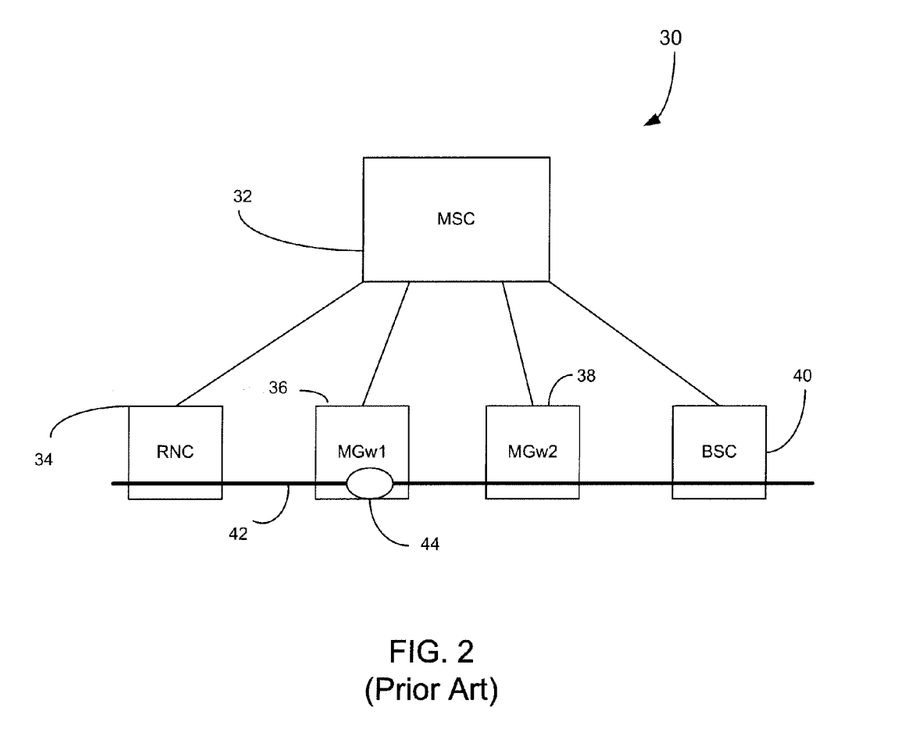
FIG. 2 (prior art) is a simplified block diagram illustrating an exemplary scenario where an MGw does not notify a MSC of a problem.

FIG. 2 is a simplified block diagram illustrating an exemplary scenario where an MGw does not notify a MSC of a problem. In the exemplary scenario, a telecommunications network 30 includes an MSC 32, an RNC 34, a MGw1 36, a MGw2 38, and a BSC 40 operating on a user plane 42. In this exemplary scenario, a problem occurs in the MGw1 36. For example, a hardware failure occurs upon a board utilized by the MGw1 handling traffic, which results in a break 44 of the user plane 42 for a call. With the occurrence of this problem, the RNC 34, the MGw1 36, the MGw2 38, and the BSC 40 all detect the call related problem. Additionally, all the nodes (RNC, MGw1, MGw2 and the BSC) initiate procedures to send a notification message about the call break to the MSC. In this case, the RNC is the fastest and sends the notification to the MSC first. The MSC receives the notification that there is a break in the call and starts a call release procedure by sending call release requests to all nodes participating in the call. The MGw1, where the problem occurred, receives the call release request prior to the MGw1 sending the notification about the call break. The problem notification message containing detailed information on the break 44 initiated by the MGw1 is automatically cancelled in the MGw1 upon receiving the call release request from the MSC. Because the MGw1 is prevented from sending any information about the call problem after receiving the call release request, the MSC does not receive any information about the call problem. Upon receipt of the call release request from the MSC, all the nodes release the resources associated with the call and confirm the call release request to the MSC.

The scenario described in FIG. 2 above is a common problem, which is exacerbated in a multi-vendor environment where some nodes are faster than others. In many telecommunications networks, it is quite common that RNCs notify the MSC faster about user plane problems than the MGws, which leads to a problem notification message not being sent by the MGw. Additionally, high loads in the MGw where the problem occurs can also introduce a delay. Problems also associated with links that transport traffic often cause a significant number of notifications being sent to the MSC. In this case, many notifications often arrive to the MSC in a different order and at different times from different nodes.

These notification messages are utilized by the MSC to measure ISP statistics (i.e., accessibility and retainability) and provide important information about the characteristics of the network and the equipment used. The MSC is unable to accurately measure these ISP statistics if the MSC does not receive all necessary and accurate information from all the nodes that handle the call.

Accordingly, there is a need for an improved system and method of providing statistical information to the MSC. The present invention provides such a system and method.

SUMMARY OF THE INVENTION

The present invention is a system and method of reporting in-service performance statistics in a network. A node within a network associated with a call detects a problem related to the call connected within the network. A problem notification message is then sent to the MSC. The MSC sends a call release message to one or more nodes within the network. The call release message includes a request to release all resources associated with the call. In response to the release request, the node releases all resources associated with the call. In addition, the node sends a release response message to the MSC. The release response message is modified to include information relating to the call problem, thereby providing network statistics to the MSC. Preferably, the node is a Media Gateway (MGw) which sends a H.248 subtract response message modified to include information on the call problem.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EMBODIMENTS

Figure 3:
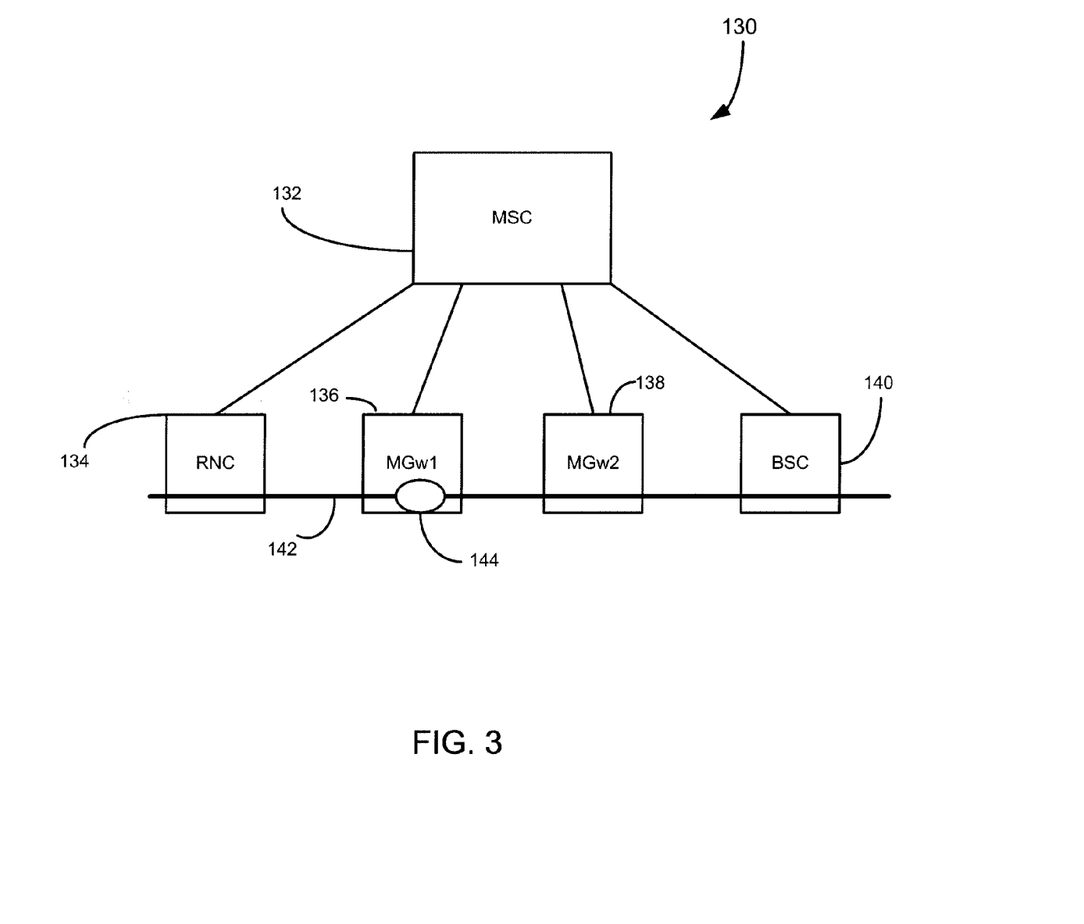
FIG. 3 is a simplified block diagram of a telecommunications network having an MSC and a plurality of nodes in the preferred embodiment of the present invention.

The present invention is a system and method of reporting in-service performance statistics in a network. FIG. 3 is a simplified block diagram of a telecommunications network 130 having an MSC 132 and a plurality of nodes including an RNC 134, an MGw1 136, an MGw2 138 and a BSC 140 in the preferred embodiment of the present invention. A call may be connected through a user plane 142 utilizing the plurality of nodes in the network 130 in the preferred embodiment of the present invention.

Figure 4:
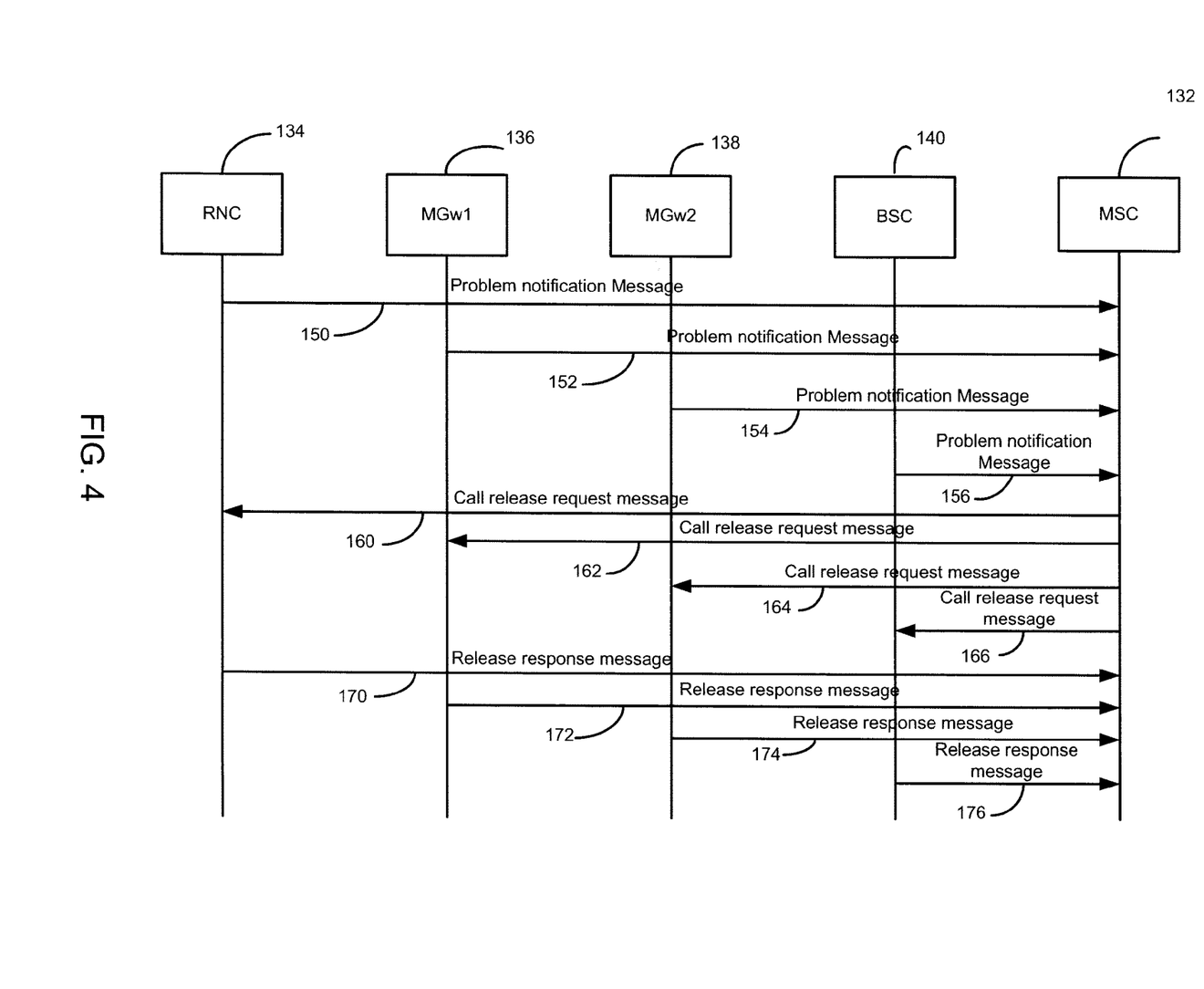
FIG. 4 is a simplified signaling diagram illustrating the messages sent between the nodes of the network of FIG. 3 in the preferred embodiment of the present invention.

Various signaling messages are sent between the plurality of nodes and the MSC. FIG. 4 is a simplified signaling diagram illustrating the messages sent between the nodes in the preferred embodiment of the present invention. When a call related problem occurs resulting in a break 144 of the user plane, such as a problem located in the MGw1 136, each node detects a problem in the call. The RNC 134, the MGw1 136, the MGw2 138 and the BSC 140 each attempt to send a problem notification message (problem notification messages 150, 152, 154, and 156) to the MSC 132. However, as discussed above, only the first notification message received by the MSC is normally received by the MSC. Next, upon receiving the first notification message from one of the nodes, the MSC sends a call release request message (call release messages 160, 162, 164, and 166) to the RNC 134, the MGw1 136, the MGw2 138 and the BSC 140. Upon receiving the call release request message, the RNC 134, the MGw1 136, the MGw2 138 and the BSC 140 release the resources associated with the call. In addition, the RNC 134, the MGw1 136, the MGw2 138 and the BSC 140 each send a call release response message (call release response messages 170, 172, 174, and 176) to the MSC. The call release response message may be a Gateway Control Protocol subtract response message in the H.248 protocol. In the present invention, the call release response message includes call statistics or information in the message that the call ended prematurely due and, if known, why the problem occurred. Thus, even if the first notification message which normally details the nature of the problem does not reach the MSC, the present invention provides a modification of the call release response message to include information on the problem with the call. Preferably, this modified H.248 call release response message includes information on the call related problem, the source of the problem, any integrity related information (e.g., quality of the call) about the call, and the source of the possible problem if known. In the present invention, the call release response message may optionally provide an indication of the fault, even if the fault was not associated with the MGw where the fault occurs. The indication may specify whether the fault was in a specific resource/node or located in another location in the network. Thus, other faults for which no node is associated may be accounted for, thereby enhancing the collection of accurate statistics.

In the preferred embodiment of the present invention, a new optional package is utilized with the H.248 messaging protocol. Specifically, this optional package includes statistical descriptors which contain call statistics information. The MGws return this package in the call release response message only when there is a problem to report (i.e., a problem in the MGw caused the release of the call. Additionally, the other nodes may optionally report information on the problem as detected by that particular node. Thus, release messages in RNC or in the BSC may include messages to the MSC providing information on the problem. In the preferred embodiment of the present invention, the MGw, upon noticing a call break, immediately notifies the MSC 132. Additionally, as discussed above, the MGw includes detailed information about the call failure with the H.248 subtract response message. The MSC then utilizes this information to collect accurate statistics about the network 130.

Figure 5A:
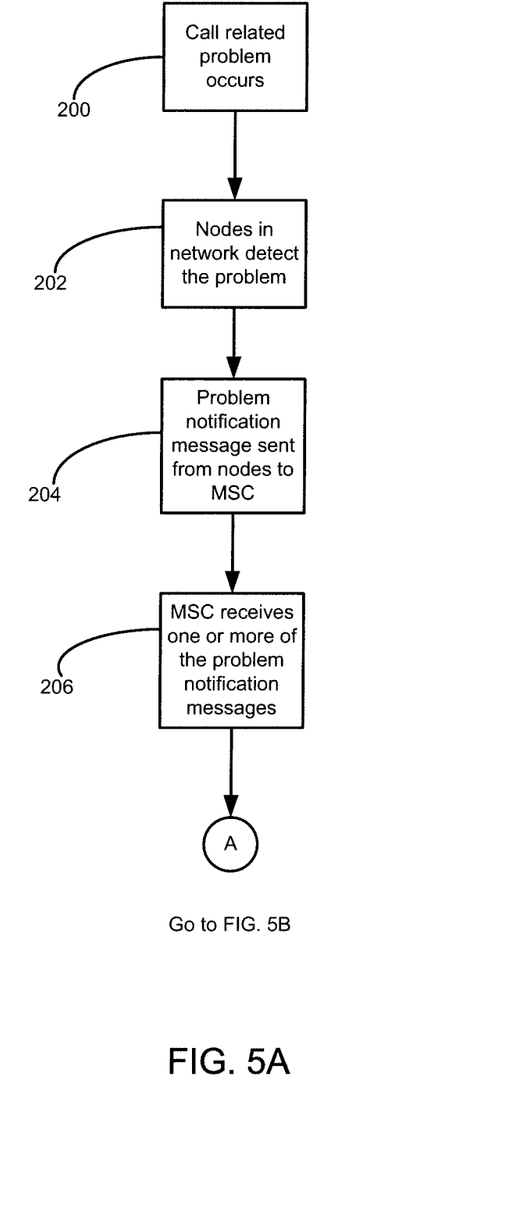
FIGS. 5A and 5B are flow charts outlining the steps for providing statistical information in the telecommunications network of FIG. 3 according to the teachings of the present invention
Figure 5B:
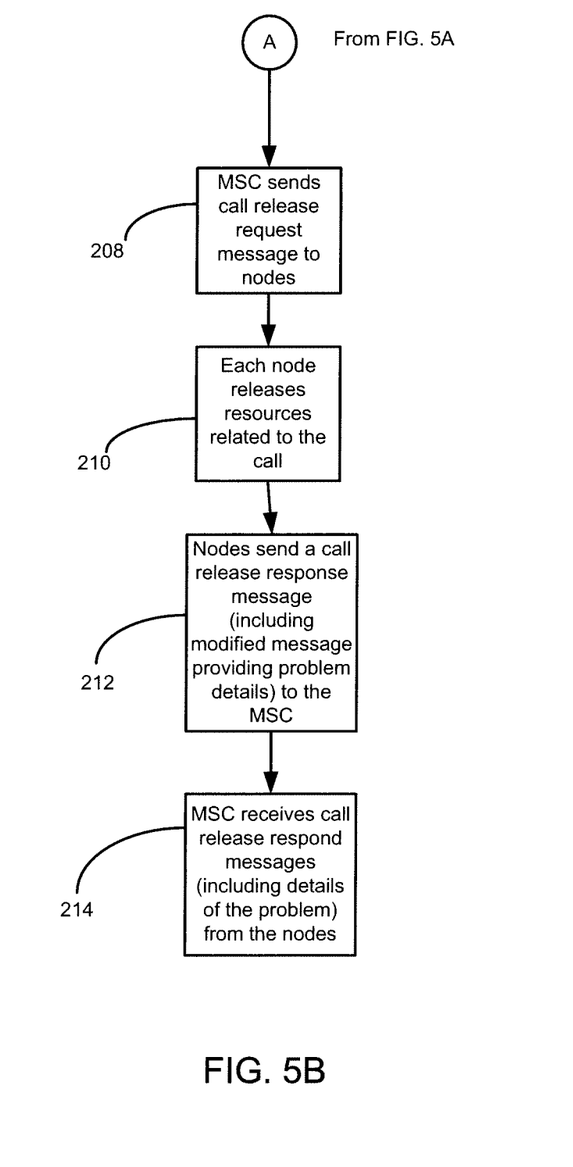

FIGS. 5A and 5B are flow charts outlining the steps for providing statistical information in the telecommunications network 130 according to the teachings of the present invention. With reference to FIGS. 3-5, the methodology will now be explained. The method begins with step 200 where a call related problem in the user plane 142 occurs. Next, in step 202, some or all of the nodes (e.g., the RNC 134, the MGw1 136, the MGw2 138 and the BSC 140) associated with the call detect a problem. The method moves to step 204 where the nodes detecting a problem initiate a call notification procedure to send a problem notification message (problem notification messages 150, 152, 154, and 156) to the MSC 132. Next, in step 206, the MSC receives one or more of the problem notification message 150 from one or more of the nodes. In step 208, the MSC sends a call release request message (call release messages 160, 162, 164, and 166) to the RNC 134, the MGw1 136, the MGw2 138 and the BSC 140 (i.e., all the nodes associate with the call). The method then moves to step 210 where each node releases its resources related to the call. In step 212, the RNC 134, the MGw1 136, the MGw2 138 and the BSC 140 each send a call release response message (call release response messages 170, 172, 174, and 176) to the MSC. The call release response message may be a Gateway Control Protocol subtract response message in the H.248 protocol. In the present invention, the call release response message is modified to include call statistics or information in the message that the call ended prematurely due and, if known, why the problem occurred. Preferably, this modified H.248 call release response message includes information of the call related problem, the source of the problem, any integrity related information about the call, and the source of the possible problem if known. The call release response message is only modified to include this information if the node has information on the problem. In the preferred embodiment of the present invention, if a node does not have this information, a conventional call release response message is sent to the MSC. In step 214, the MSC receives the modified call release response message containing information related to the problem, thereby providing accurate statistical data about network performance.

Referring to FIGS. 3-5, an exemplary scenario utilizing the system and method described above will now be explained. A problem is encountered in Mw1 136 with a break 144 which disrupts the user plane 142. The RNC 134, the MGw1 136, the MGw2 138, and the BSC 140 all detect the failure. In addition, the mobile subscriber also detects degradation in call quality. Next, the nodes (i.e., the RNC 134, the MGw1 136, the MGw2 138, and the BSC 140) all start the procedure to send a problem notification message to the MSC 132. However, as is typically in this network 130, the RNC is the first to send the problem notification message 150 to the MSC. The MSC 132 receives the notification that there is a break with this call and initiates a call release procedure. In particular, the MSC sends a call release request message to all the nodes associated with the call (i.e., RNC 134, the MGw1 136, the MGw2 138, and the BSC 140). MGw1, where the problem occurred, receives the call release request before it has sent the notification about the call break. Thus, MGw1, as in the existing network 30, cancels the sending of the notification message. Additionally, all the nodes (i.e., the RNC 134, the MGw1 136, the MGw2 138, and the BSC 140), in response to the call release request message, release all resources associated with the call. The nodes also send a release response message to the MSC confirming that the resources have been released. However, in the preferred embodiment of the present invention, the call release response message 172 from the MGw1 to the MSC includes information about why the call was disconnected and detailed information about the problem (e.g., information that the call was released due to a hardware failure of a board). Addition, the MGw2 138 sends the call release response message 174 that includes information that the call ended prematurely due to an external fault. The MGw2 does not send detailed information about the cause of the problem since it does not have that information. The MSC then utilizes the information obtained from the problem notification message or the release response message to update the network statistics. For the scenario discussed above, the detailed information is sent in the call release response message 172.

In an alternative embodiment, call statistics related information is always provided in the call release response message, even when the call is successful and incurs no problems. This alternative does not provide the same efficiency as the preferred embodiment. In another alternate embodiment of the present invention, the statistics descriptor of an existing package may be updated to contain the call statistics information. In still another alternate embodiment, a new or existing descriptor of a package may be updated to contain the call statistics information. In another alternate embodiment, call release in the MGw may be delayed until all notifications have been sent. The handling of call related resources is not as efficient in this alternative as the preferred embodiment.

The present invention enables the accurate and timely collection of network statistics at all levels of the network. The obtained network statistics are far more reliable than statistics obtained in existing networks. The present invention is easily implemented and provides a cost-effective solution to the problem of obtaining accurate network statistics.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of reporting in-service performance statistics in a network having a mobile switching center controlling a node associated with a call connected within the network, the method comprising the steps of:

the node detecting a problem, the problem relating to the call connected within the network;

sending a problem notification message to the mobile switching center;

the node receiving a call release message from the mobile switching center, the call release message requesting release of all resources associated with the call;

the node releasing all resources associated with the call; and the node sending a subtract response message to the mobile switching center, the subtract response message being modified to include detailed information relating to the call problem, wherein the mobile switching center utilizes the detailed information for collecting accurate network statistics.

2. The method of claim 1, wherein a subtract response message is modified only if a call problem is detected by the node for a call.

3. The method in of claim 1, wherein a subtract response message is always sent without regard to whether a problem is detected for a call.

4. The method of claim 1, wherein a statistic descriptor containing call statistical information on the call is added to the subtract response message.

5. The method of claim 1, wherein the subtract response message is a H.248 subtract response message.

6. The method of claim 1, wherein the subtract response message includes a statistic descriptor modified to contain call statistical information about the call problem.

7. The method of claim 1, wherein the subtract response message includes integrity related information about the call.

8. The method of claim 1, wherein the node is a media gateway.

9. The method of claim 1, wherein the node sends the problem notification message to the mobile switching center.

10. A system for reporting in-service performance statistics in a network, the system comprising:
a media gateway associated with a call; and
a mobile switching center configured to control the media gateway,
wherein the media gateway comprises one or more processors with memory configured to:
detect a problem with the call; and
send information related to the detected problem in a subtract response message in a H.248 signaling protocol to the mobile switching center,
wherein the mobile switching center is configured to request the release of call resources in response to being informed of the problem with the call,
wherein the media gateway is configured to respond to the request by sending the subtract response message to the mobile switching center, and
wherein the mobile switching center is configured to use the detailed information for collecting accurate network statistics.

11. The system of claim 10 the media gateway is configured to modify the subtract response message is modified to include information on the problem.

12. The system of claim 11, wherein the media gateway is configured to modify the subtract response message only if a problem is detected by the media gateway.

13. A media gateway node within a communications network configured to provide statistical network information, the node comprising one or more processors with memory configured to:
detect a problem with a call in the communications network; and
send information related to the detected problem in a subtract response message in a H.248 signaling protocol to a mobile switching center with the media gateway node,
the media gateway node being configured to send the subtract response message to the mobile switching center in response to receiving a request from the mobile switching center to release call resources, the request being in response to the mobile switching center being informed of the problem with the call.

14. The media gateway node claim 13, wherein the media gateway node is configured to modify the subtract response message to include information on the problem of the call.

15. The media gateway node of claim 13, wherein the media gateway node is configured to modify the subtract response message only if a problem is detected by the media gateway node for the call.

16. The media gateway node of claim 13, wherein the subtract response message includes integrity related information about the call.

* * * * *

UNITED STATES PATENT AND TRADEMARK OFFICE
CERTIFICATE OF CORRECTION

| | | |
|---|---|---|
| PATENT NO. | : 8,964,576 B2 | Page 1 of 1 |
| APPLICATION NO. | : 12/532319 | |
| DATED | : February 24, 2015 | |
| INVENTOR(S) | : Laipio et al. | |

It is certified that error appears in the above-identified patent and that said Letters Patent is hereby corrected as shown below:

IN THE SPECIFICATION

Column 2, Line 47, delete "know" and insert -- known --, therefor.

Column 3, Line 67, delete "invention; and" and insert -- invention; --, therefor.

Column 4, Line 3, delete "invention." and insert -- invention; and --, therefor.

Column 4, Line 7, delete "invention" and insert -- invention. --, therefor.

Column 5, Line 2, delete "call." and insert -- call). --, therefor.

IN THE CLAIMS

Column 7, Line 7, in Claim 3, delete "in of" and insert -- of --, therefor.

Column 8, Line 7, in Claim 11, delete "claim 10" and insert -- claim 10, wherein --, therefor.

Column 8, Line 8, in Claim 11, delete "is modified to" and insert -- to --, therefor.

Column 8, Line 20, in Claim 13, delete "center" and insert -- center associated --, therefor.

Column 8, Line 27, in Claim 14, delete "node" and insert -- node of --, therefor.

Signed and Sealed this
Twenty-eighth Day of July, 2015

Michelle K. Lee
*Director of the United States Patent and Trademark Office*